(12) United States Patent
Lin

(10) Patent No.: US 8,926,249 B2
(45) Date of Patent: Jan. 6, 2015

(54) SCREW

(71) Applicant: Fushang Co., Ltd., Kaohsiung (TW)

(72) Inventor: Jung-Nan Lin, Kaohsiung (TW)

(73) Assignee: Fushang Co., Ltd., Kaohsiung (TW)

( * ) Notice: Subject to any disclaimer, the term of this patent is extended or adjusted under 35 U.S.C. 154(b) by 40 days.

(21) Appl. No.: 13/866,091

(22) Filed: Apr. 19, 2013

(65) Prior Publication Data
US 2014/0314523 A1 Oct. 23, 2014

(51) Int. Cl.
*F16B 25/00* (2006.01)
(52) U.S. Cl.
USPC .......................................... 411/386; 411/412
(58) Field of Classification Search
USPC ................. 411/386, 412, 387.2, 387.4, 387.8
IPC ...................... F16B 25/0052, 25/0057, 25/0078
See application file for complete search history.

(56) References Cited

U.S. PATENT DOCUMENTS

| 6,468,014 B2 * | 10/2002 | Chen .............................. 411/411 |
| 7,988,396 B2 * | 8/2011 | Weiss et al. .................... 411/386 |
| 2007/0217887 A1 * | 9/2007 | Lin ................................. 411/413 |
| 2009/0245973 A1 * | 10/2009 | Pieciak et al. ................. 411/413 |

* cited by examiner

*Primary Examiner* — Gary Estremsky
(74) *Attorney, Agent, or Firm* — Alan D. Kamrath; Kamrath IP Firm, P.A.

(57) ABSTRACT

A screw includes a shank, at least one end cutting groove, a first thread, and a second thread. The shank includes a lower section disposed near an insertion end thereof and an upper section disposed near a head end thereof. The lower section has triangular transverse cross sections, and the upper section has circular transverse cross sections. The end cutting groove is formed in the lower section of the shank, and an included angle between 3 and 9 degrees is formed between an extending direction of the end cutting groove and a longitudinal axis of the shank. The first thread is disposed on the lower section of the shank and includes a plurality of asymmetrical thread convolutions.

4 Claims, 10 Drawing Sheets

SCREW

BACKGROUND OF THE INVENTION

The present invention relates to a screw and, more particularly, to a screw suitable for using in wood, construction materials, and similar materials.

Large amount of wood or compound wooden materials mixed and compressed from plastic resin and wood chips are used to produce wooden work-pieces for furniture, decoration and construction, and screws are often used in connection between wooden work-pieces.

A conventional screw 10 for using with wood is shown in FIG. 1. The screw 10 includes a round shank 12 and a thread 14 disposed on the shank 12. The shank 12 includes an insertion end 16 and a head end 17. The insertion end 16 has an end cutting groove 18. When the screw 10 is screwed into a to-be-connected work-piece with the insertion end 16, the end cutting groove 18 is used for cutting the work-piece so that the thread 14 can be screwed into the work-piece smoothly. However, because the cross section of the shank 12 of the screw 10 in FIG. 1 is round, a relatively larger friction force is produced from the full contact between the thread 14 and the work-piece when the thread 14 is screwed into the work-piece, which will require more effort and time in operation. Furthermore, the end cutting groove 18 of the screw 10 extends axially along the shank 12 which makes it difficult for wood chips produced from cutting to be expelled smoothly. Therefore, the screw 10 will be easily obstructed by the waste chips during the process of screwing into the work-piece, which will require more effort in operation, and the work-piece will easily crack because of compression. Additionally, when the screw 10 is used for screwing into compound sheets mixed and compressed from plastic resin and wood chips, the waste chips can not be effectively cut off because the end cutting groove 18 of the screw 10 extends axially along the shank 12, and obstructions will be produced when the screw 10 is screwed into the compound sheets.

Conventional screws 10a and 10b used for screwing into compound sheets mixed and compressed from plastic resin and wood chips are shown in FIGS. 1A and 1B respectively. Each of the screws 10a and 10b includes a shank 12 and a thread 14 disposed on a lower section of the shank 12. The shank 12 includes an insertion end 16 and a head end 17. Furthermore, the thread 14 of the screw 10a in FIG. 1A near the insertion end 16 has a smaller thread height favorable for screwing into the compound sheet surfaces. V-shaped grooves 19 are disposed in the thread 14 favorable for the expelling of waste chips produced from the screwing of the screw 10a. However, the speed of screwing of the screw 10a into the compound sheets is relatively slow. Specifically, the thread convolutions with smaller thread height are designed for allowing the screw 10a to screw into the compound sheets slowly so that there is more time for the waste chips to be expelled. Additionally, the V-shaped grooves 19 of the screw 10a can not effectively cut off the waste chips. As for the screw 10b in FIG. 1B, even though the screw 10b can be screwed into the compound sheets with faster speed, the thread 14 of the screw 10b can not effectively cut off the waste chips. As a result, the screw 10b will be obstructed by the waste chips when it is screwed into the work-piece, and the compound sheets will therefore crack easily.

BRIEF SUMMARY OF THE INVENTION

It is an objective of the present invention to provide a screw suitable for using in wood and construction materials. The screw can effectively reduce the frictional resistance when the screw is screwed into a work-piece so that the screw can be screwed into the work-piece speedily, and an upper section of a shank of the screw can be locked into the work-piece smoothly.

To achieve this and other objectives, a screw of the present invention includes a shank, at least one end cutting groove, first and second threads. The shank includes an insertion end and a head end spaced from the insertion end along a longitudinal axis. The shank further includes a straight section defined between the insertion end and the head end and including a lower section disposed near the insertion end and an upper section disposed near the head end. The lower section has a rough triangular transverse cross section, and the upper section has a circular transverse cross section. The end cutting groove is disposed in the lower section of the shank and extends from the insertion end toward the head end upwardly and slantingly. An included angle is formed between an extending direction of the end cutting groove and the longitudinal axis and is between 3 and 9 degrees. The first thread is spirally disposed on an outer circumference of the lower section of the shank and includes a plurality of asymmetrical thread convolutions. The second thread is spirally disposed on an outer circumference of the upper section of the shank and includes a plurality of thread convolutions. An upward spiral direction of the second thread is opposite to that of the first thread.

In an embodiment, the screw includes two end cutting grooves opposite along a circumference direction of the shank. The upward extending direction of each of the end cutting grooves is the same as the upward spiral direction of the first thread.

Preferably, each of the asymmetrical thread convolutions of the first thread has a first cutting surface and a second cutting surface. An included angle between the first cutting surface and a horizontal axis perpendicular to longitudinal axis is between 15 and 25 degrees, and an included angle between the second cutting surface and the horizontal axis is between 5 and 15 degrees.

The present invention will become clearer in light of the following detailed description of illustrative embodiments of this invention described in connection with the drawings.

DETAILED DESCRIPTION OF THE INVENTION

Figure 1:
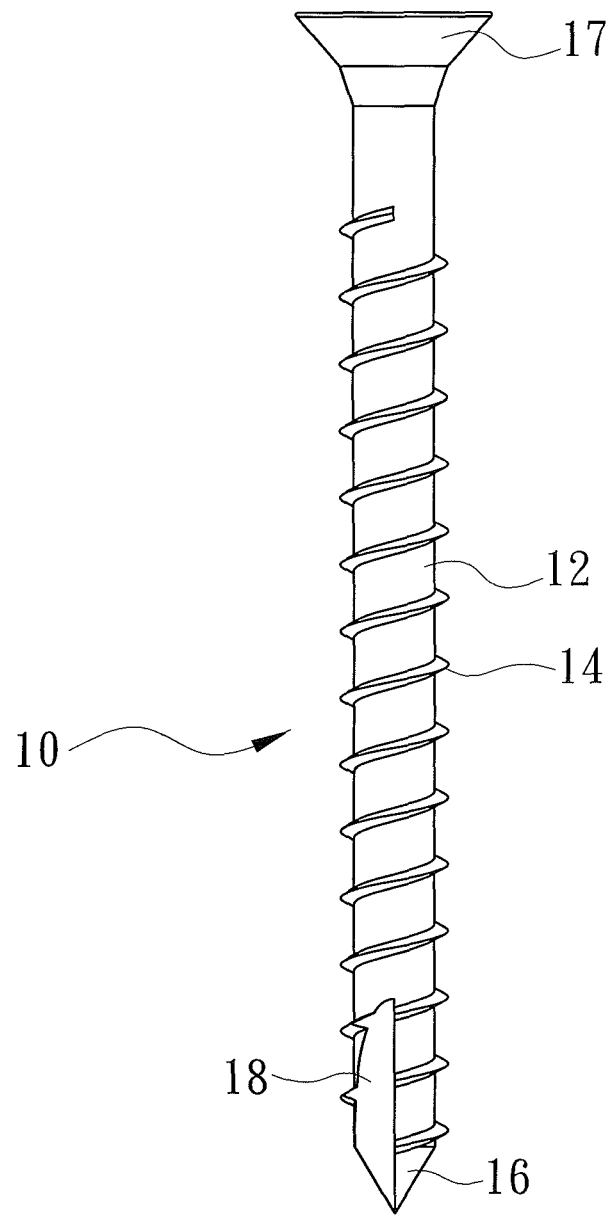
FIG. 1 is schematic view of a conventional screw.
Figure 1A:
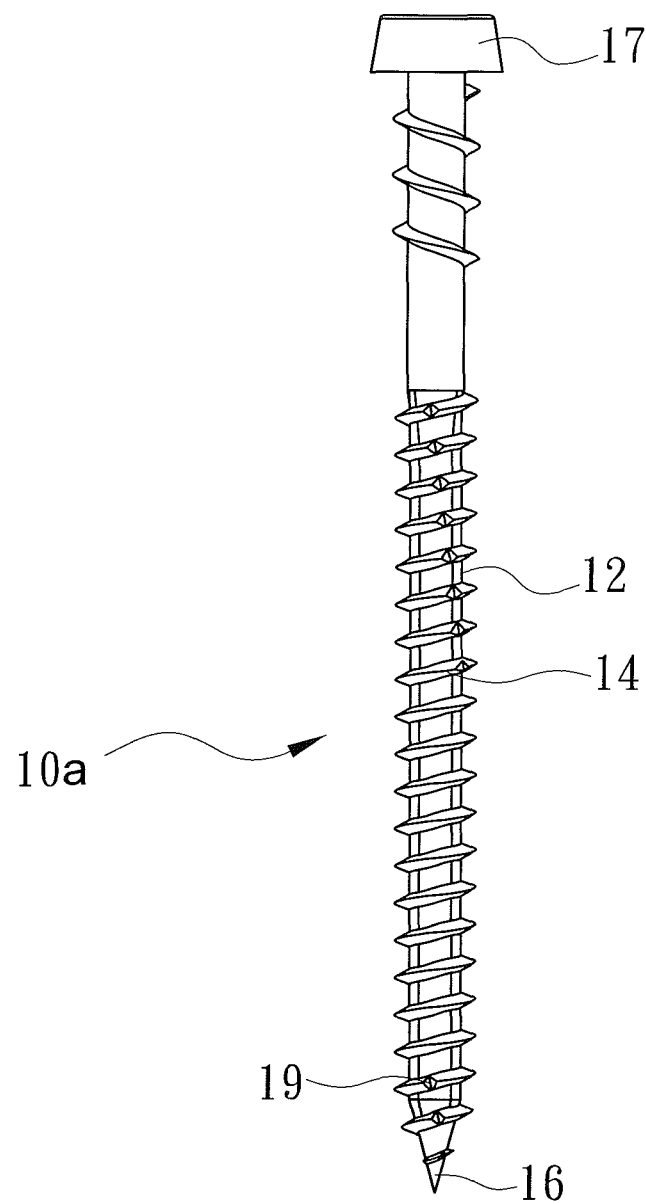
FIG. 1A is schematic view of a conventional screw for using in compound sheets.
Figure 1B:
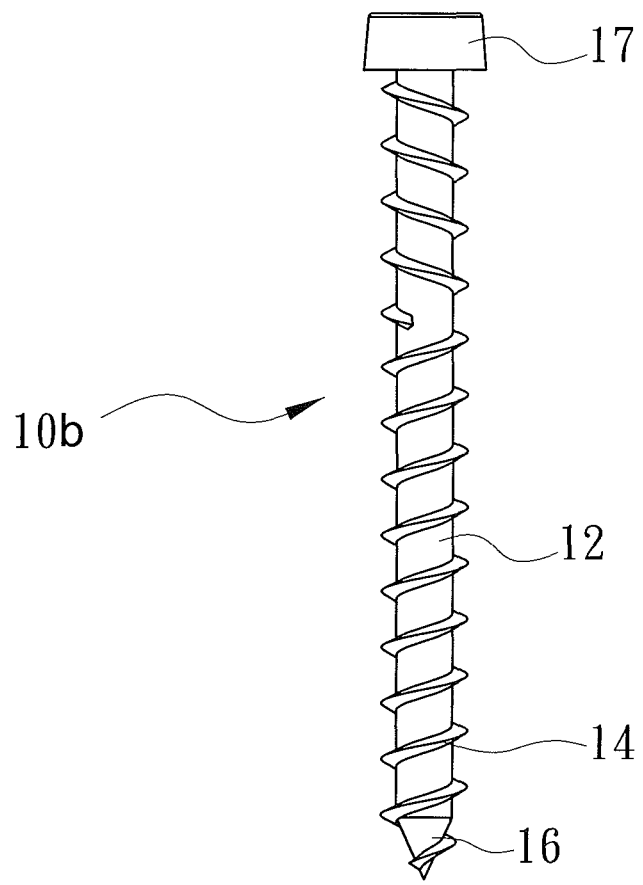
FIG. 1B is schematic view of another conventional screw for using in compound sheets.

A screw 20 according to an embodiment of the present invention is shown in FIGS. 2 through 8 of the drawings and generally designated 20. The screw 20 includes a shank 22 having an insertion end 24 and a head end 26 spaced from the insertion end 24 along a longitudinal axis. In this embodiment, the insertion end 24 is formed as a drilling bit. A receiving hole 28 is disposed in an upper surface of the head end 26 for a screwdriver (not shown) to insert into. The shank 22 has a straight section with roughly the same outer diameter between the insertion end 24 and the head end 26. The straight section includes a lower section 30 disposed near the insertion end 24 and an upper section 32 disposed near the head end 26. The lower section 30 has rough regular triangular transverse cross sections. The upper section 32 has circular transverse cross sections.

Figure 4:
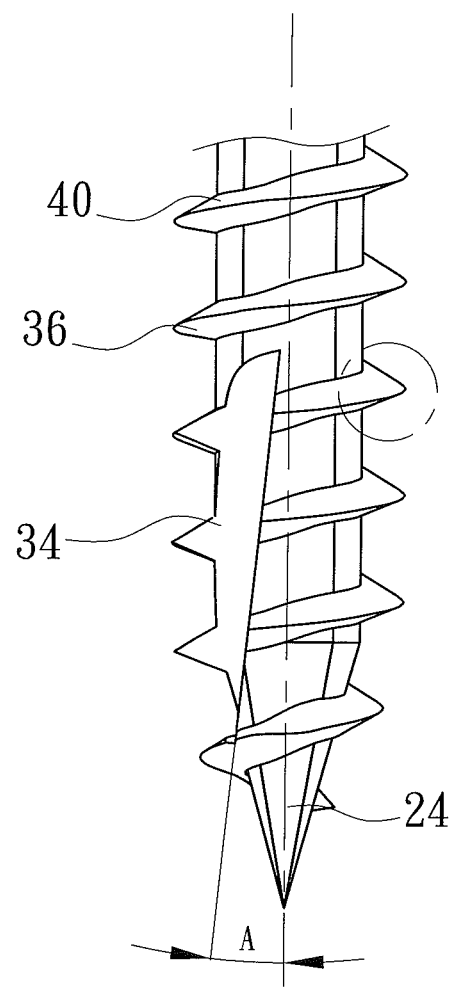
FIG. 4 is a partial, enlarged view of the screw of FIG. 3.
Figure 5:
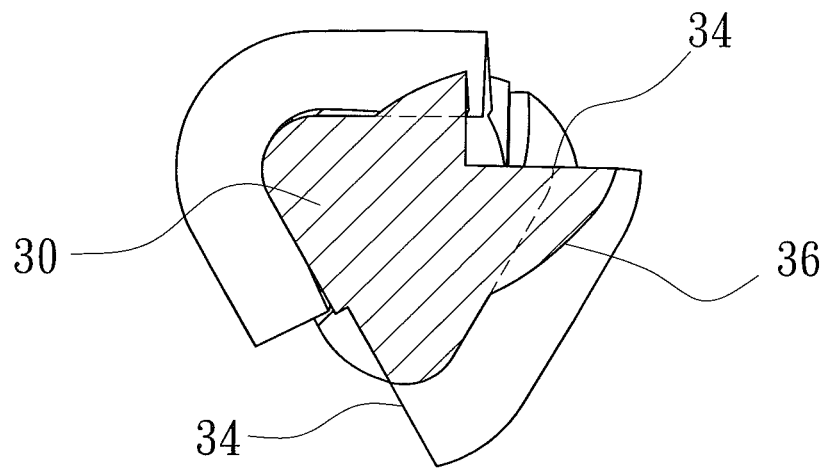
FIG. 5 is sectional view taken along line 5-5 of FIG. 3.
Figure 6:
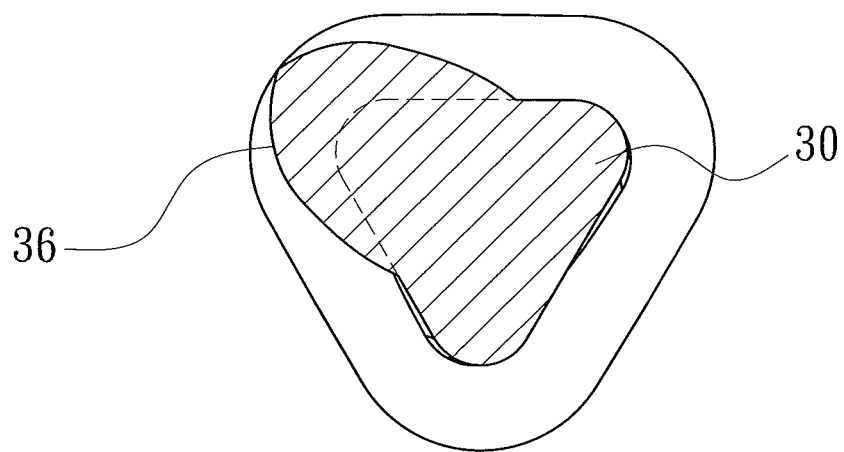
FIG. 6 is sectional view taken along line 6-6 of FIG. 3.
Figure 7:
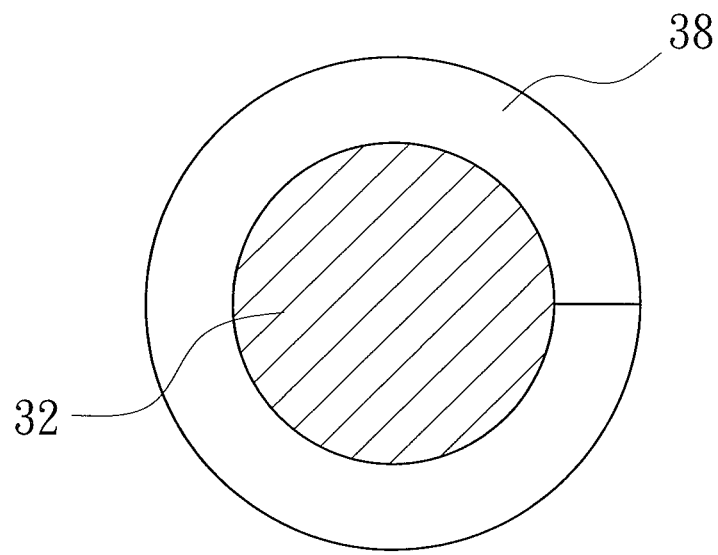
FIG. 7 is sectional view taken along line 7-7 of FIG. 3.
Figure 8:
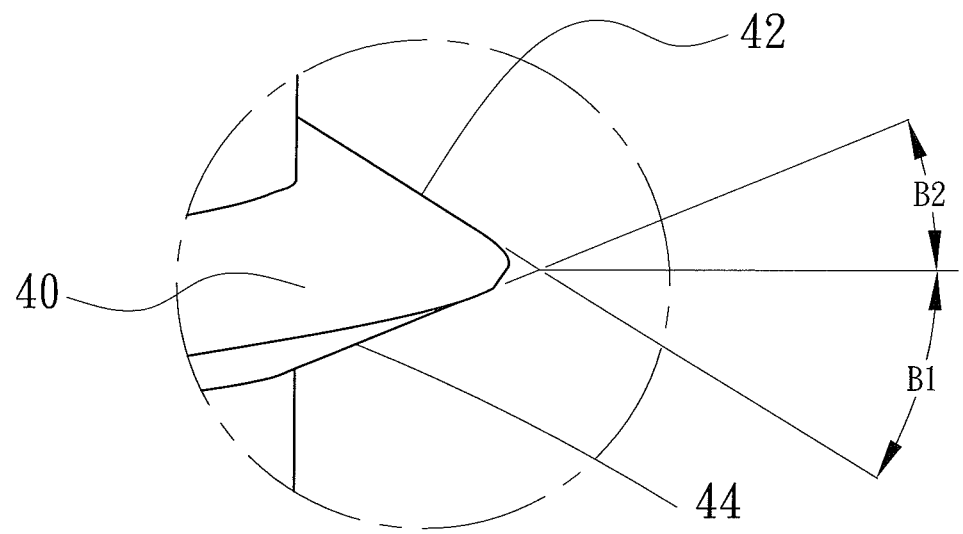
FIG. 8 is an enlarged view of a circled portion of FIG. 4.
Figure 9:
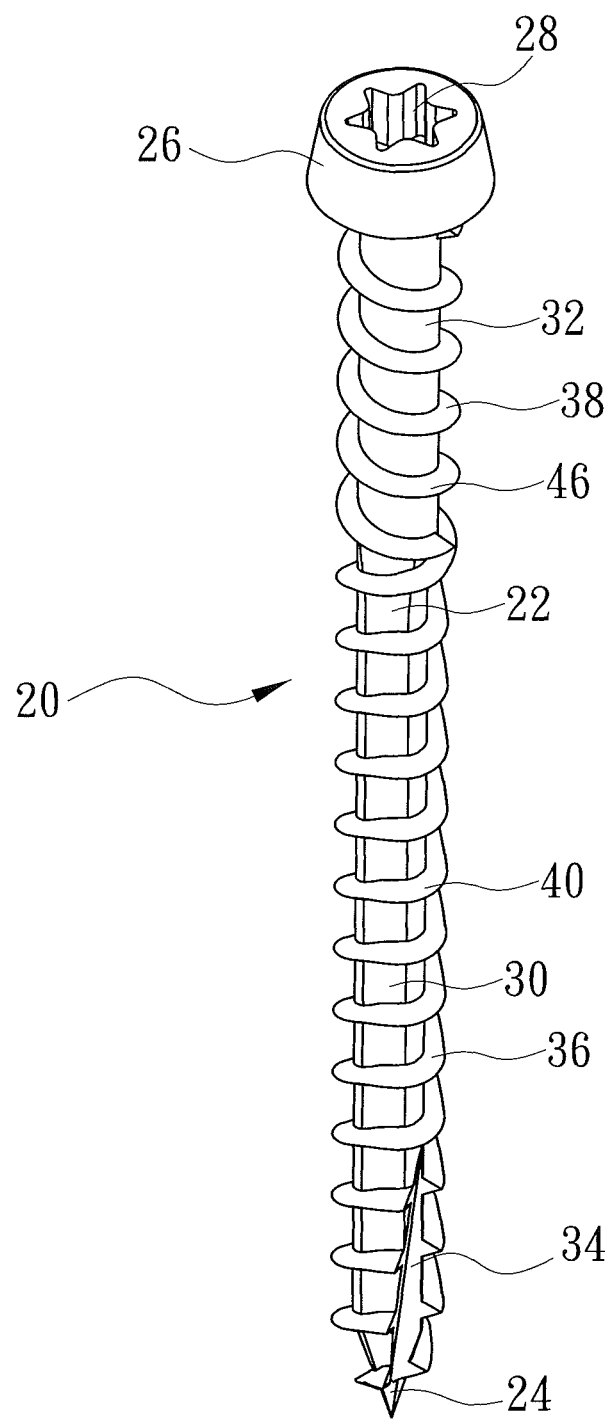
FIG. 9 is a perspective view of a screw according to another embodiment of the present invention.

The screw 20 further includes at least one end cutting groove 34. In this embodiment, the screw 20 is provided with two end cutting grooves 34. The end cutting grooves 34 are disposed in the lower section 30 of the shank 22 and extend to a certain length from the insertion end 24 toward the head end 26 (as shown in FIGS. 4 and 5). Each end cutting groove 34 extends from the insertion end 24 upwardly and slantingly to the upper right, and an included angle (A) is formed between the extending direction of one of the end cutting grooves 34 and the longitudinal axis. The included angle (A) is between 3 and 9 degrees (see FIG. 4). One or two of the end cutting grooves 34 can be disposed based on different metals of the shank 22. In this embodiment, the screw 20 is made of coated iron and includes the two end cutting grooves 34 opposite in a circumference direction of the shank 22 as shown in FIG. 5. The coating on the iron screw 20 is antirust, and the coating color can be similar to or the same as that of a work-piece for aesthetic look. However, the screw 20 made of stainless steel can only include one end cutting groove 34 as shown in FIG. 9. The head end 26 of the screw 20 made of stainless steel can also be coated with coating having the same color as or a similar color to that of the work-piece for aesthetic look.

Figure 2:
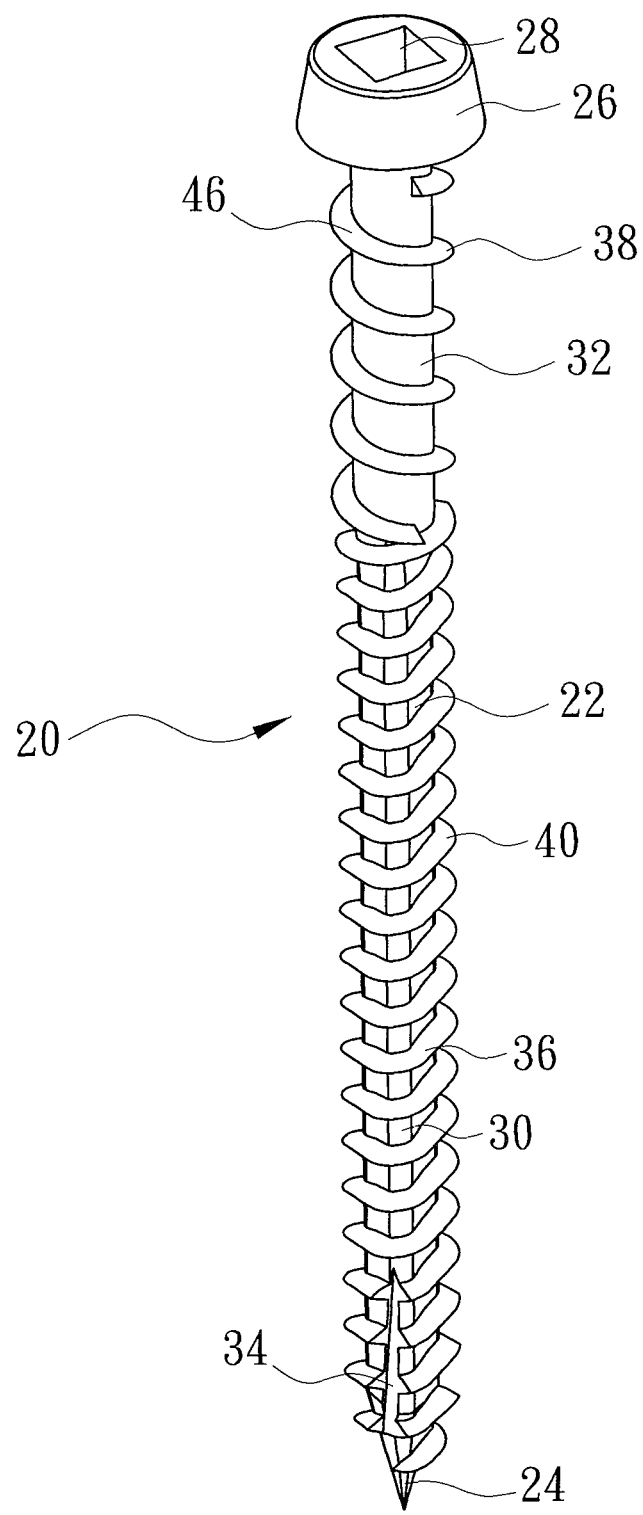
FIG. 2 is a perspective view of a screw according to an embodiment of the present invention.
Figure 3:
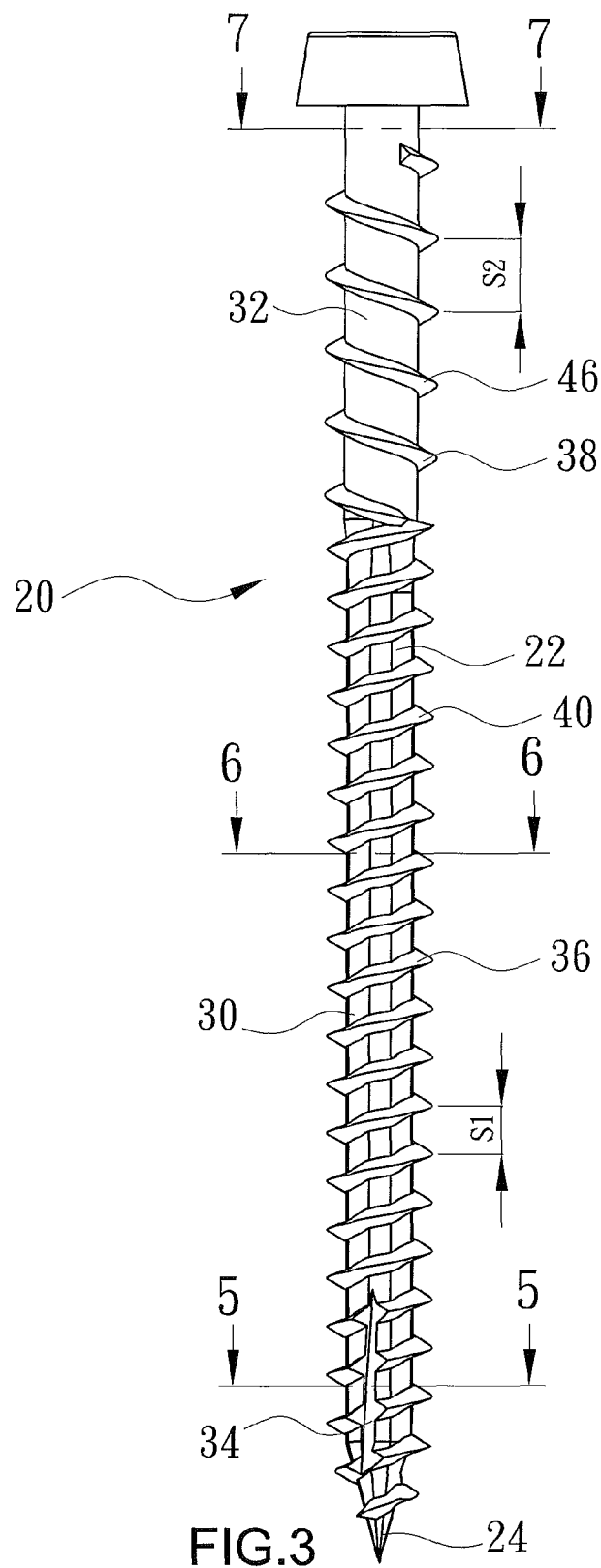
FIG. 3 is an elevational view of the screw of FIG. 2.

The screw 20 further includes a first thread 36 and a second thread 38. The first thread 36 is spirally formed on an outer circumference of the lower section 30 of the shank 22 and includes a plurality of asymmetrical thread convolutions 40. Each of the thread convolutions 40 has a first cutting surface 42 and a second cutting surface 44 (see FIG. 8). An included angle (B1) between the first cutting surface 42 and a horizontal axis perpendicular to longitudinal axis is between 15 and 25 degrees, and an included angle (B2) between the second cutting surface 44 and the horizontal axis is between 5 and 15 degrees. The second thread 38 is spirally formed on an outer circumference of the upper section 32 of the shank 22 and includes a plurality of thread convolutions 46. An upward spiral direction of the second thread 38 is opposite to that of the first thread 36. As shown in FIG. 2, the second thread 38 is winded around and extended clockwise toward the upper left direction, while the first thread 36 is winded around and extended anticlockwise toward the upper right direction. The upward spiral direction of the first thread 36 is the same as the upward extending direction of the end cutting groove 34 (upwardly and slantingly to the upper right). As shown in FIG. 3, a thread distance (S2) of the thread convolutions 46 of the second thread 38 is larger than a thread distance (S1) of the thread convolutions 40 of the first thread 36, which is favorable for speedy screwing of the screw 20.

Figure 10:
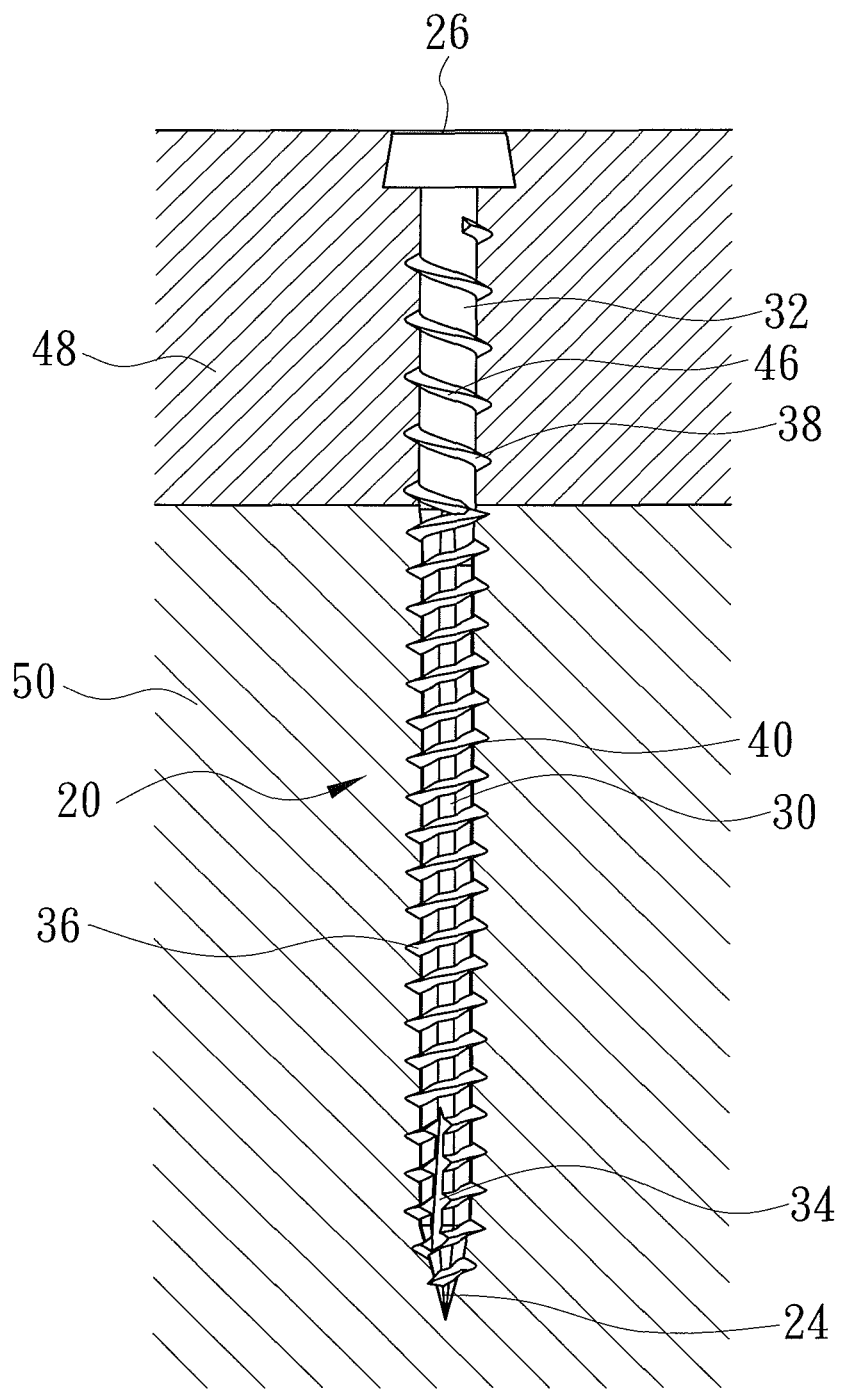
FIG. 10 is a view of the screw of FIG. 2 illustrating use of the screw coupled with two work-pieces.

Referring to FIG. 10, when in use, the screw 20 is screwed into work-pieces 48 and 50 (such as wooden articles) to be interlocked together with the insertion end 24. Because the upward extending direction of the end cutting grooves 34 is the same as the upward spiral direction of the first thread 36 of the lower section 30, when the insertion end 24 of the screw 20 is screwed into the work-piece 48, the end cutting grooves 34 and the first thread 36 will cut the work-piece 48 at the same time while screwing into the work-piece 48. Because the first thread 36 with the triangular cross sections is not in full contact with the work-pieces 48 and 50, the friction resistance of screwing can be reduced. Furthermore, waste chips produced from cutting the work-pieces 48 and 50 will be forced inside the end cutting grooves 34 and then expelled outside along the outer circumference of the lower section 30 with the triangular cross sections. Therefore, the resistance against the screw 20 along the screwing direction can be reduced, and the screwing speed can further be enhanced. Additionally, when the upper section 32 of the screw 20 is screwed into the work-piece 48, the screwing of the second thread 38 can provide a hole expanding effect. Thus, the lower section 30 of the screw 20 will be able to screw into the work-piece 50 smoothly, and the upper section 32 of the screw 20 can be embedded into the work-piece 48 completely and tightly. As a result, the work-pieces 48 and 50 can be firmly connected. Furthermore, the asymmetric thread convolutions 40 of the first thread 36 can enhance the coupling ability of the screw 20 because it is easy to screw the thread convolutions 40 of the first thread 36 into the work-pieces 48 and 50 and not easy to unscrew them.

When the screw 20 of the present invention is used for screwing into the compound sheets mixed and compressed from plastic resin and wood chips, the screw 20 can produce outstanding effects. Specifically, the plastic parts of the compound sheets are elastic, and the waste chips produced from cutting the compound sheets are mixtures from wood chips and plastic instead of simply powdery wood chips, which cause the conventional screw 10 in FIG. 1 unable to cut and screw into the work-pieces smoothly and unable to expel the waste chips of the compound sheets smoothly. The designs of the end cutting groove 34 and the lower section 30 with the triangular cross section of the screw 20 can effectively and speedily cut through the compound sheets and screw into the work-pieces. The waste chips of the compound sheets can be expelled outside along the end cutting grooves 34 and the lower section 30 with the triangular cross section to reduce the resistance against the screw 20 along the screwing direction. Furthermore, when the screw 20 is screwed into the compound sheets, the portions of the compound sheets in contact with the screw 20 will be squeezed upward. The portions being squeezed upward can be pressed downward by the designs of the opposite spiral directions of the second thread 38 of the upper section 32 and the first thread 36 of the lower section 30 of the shank 22, and the tight coupling effect can be achieved.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:
1. A screw comprising:
a shank including an insertion end and a head end spaced from the insertion end along a longitudinal axis, with the shank further including a straight section defined between the insertion end and the head end, with the straight section including a lower section disposed near the insertion end and an upper section disposed near the head end, with the lower section having rough triangular transverse cross sections, with the upper section having circular transverse cross sections;

at least one end cutting groove disposed in the lower section of the shank and extending upward from the insertion end toward the head end, with an included angle formed between an extending direction of the end cutting groove and the longitudinal axis, with the included angle being between 3 and 9 degrees;

a first thread spirally disposed on an outer circumference of the lower section of the shank and including a plurality of asymmetrical thread convolutions; and a second thread spirally disposed on an outer circumference of the upper section of the shank and including a plurality of thread convolutions, with an upward spiral direction of the second thread being opposite to an upward spiral direction of the first thread.

2. The screw according to claim 1, with the screw including two end cutting grooves opposite along a circumference direction of the shank, with the upward extending direction of each of the end cutting grooves being the same as the upward spiral direction of the first thread.

3. The screw according to claim 1, with a thread distance of the thread convolutions of the second thread being larger than a thread distance of the thread convolutions of the first thread, with the lower section having rough regular triangular transverse cross sections.

4. The screw according to claim 1, with each of the asymmetrical thread convolutions having a first cutting surface and a second cutting surface, with an included angle between the first cutting surface and a horizontal axis perpendicular to longitudinal axis being between 15 and 25 degrees, with an included angle between the second cutting surface and the horizontal axis being between 5 and 15 degrees.

* * * * *